US 12,142,925 B2

(12) United States Patent
Mitani et al.

(10) Patent No.: US 12,142,925 B2
(45) Date of Patent: Nov. 12, 2024

(54) POWER TRANSMISSION DEVICE AND POWER SUPPLY SYSTEM

(71) Applicant: HONDA MOTOR CO., LTD., Tokyo (JP)

(72) Inventors: Manabu Mitani, Wako (JP); Masataka Yoshida, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/189,371

(22) Filed: Mar. 24, 2023

(65) Prior Publication Data
US 2023/0318303 A1    Oct. 5, 2023

(30) Foreign Application Priority Data
Mar. 30, 2022   (JP) ................... 2022-056812

(51) Int. Cl.
*H02J 3/38*   (2006.01)
(52) U.S. Cl.
CPC ...................... *H02J 3/38* (2013.01)
(58) Field of Classification Search
CPC ........................................ H02J 3/38
USPC ............................................... 307/18
See application file for complete search history.

(56) References Cited

U.S. PATENT DOCUMENTS

2015/0102663 A1* 4/2015 Brouwer ............... H02J 4/00
307/9.1
2022/0204173 A1 6/2022 Barraco et al.

FOREIGN PATENT DOCUMENTS

WO  2020/217007 A1  10/2020

* cited by examiner

*Primary Examiner* — Hal Kaplan
(74) *Attorney, Agent, or Firm* — Rankin, Hill & Clark LLP (57) ABSTRACT

A power transmission device that transmits electric power from a PCU to drive modules includes: a power-source-side positive terminal and a power-source-side negative terminal that are connected to the PCU and receive DC power; and load-side positive terminals and load-side negative terminals each connected to corresponding one of the drive modules and output DC power. The load-side positive terminals and the load-side negative terminals are arranged in a line in the order of the load-side positive terminal, the load-side negative terminal, the load-side negative terminal, and the load-side positive terminal.

2 Claims, 9 Drawing Sheets

POWER TRANSMISSION DEVICE AND POWER SUPPLY SYSTEM

CROSS-REFERENCE TO RELATED APPLICATIONS

This application is based upon and claims the benefit of priority from Japanese Patent Application No. 2022-056812 filed on Mar. 30, 2022, the contents of which are incorporated herein by reference.

BACKGROUND OF THE INVENTION

Field of the Invention

The present invention relates to a power transmission device and a power supply system.

Description of the Related Art

WO 2020/217007 A1 discloses an aircraft including a first DC distribution bus for supplying electric power from a first generator to a first load device, and a second DC distribution bus for supplying electric power from a second generator to a second load device.

SUMMARY OF THE INVENTION

In the technique of WO 2020/217007 A1, the first DC distribution bus and the second DC distribution bus are connected to each other via a contactor. It is conceivable to configure the first DC distribution bus as a single power transmission device and configure the second DC distribution bus as another power transmission device. In this case, it is necessary to connect, by wiring, the power transmission device in which the first DC distribution bus is formed and the power transmission device in which the second DC distribution bus is formed. It is desired to simplify the structure of the wiring that connects the power transmission device in which the first DC distribution bus is formed and the power transmission device in which the second DC distribution bus is formed.

An object of the present invention is to solve the above-mentioned problem.

According to a first aspect of the present invention, there is provided a power transmission device that transmits electric power from a power source device to load devices, the power transmission device comprising: input terminals connected to the power source device and configured to receive direct current power; and output terminals each connected to corresponding one of the load devices and configured to output direct current power, wherein the output terminals include two positive terminals and two negative terminals, and the positive terminals and the negative terminals are arranged in a line in an order of the positive terminal, the negative terminal, the negative terminal, and the positive terminal, or in an order of the negative terminal, the positive terminal, the positive terminal, and the negative terminal.

According to a second aspect of the present invention, there is provided a power supply system comprising two power transmission devices according to the first aspect, wherein the power supply system includes two power source devices, and the two power transmission devices are disposed so as to face each other between the two power source devices.

According to the present invention, the wiring structure between the power transmission device and the load device can be simplified.

The above and other objects, features, and advantages of the present invention will become more apparent from the following description when taken in conjunction with the accompanying drawings, in which a preferred embodiment of the present invention is shown by way of illustrative example.

DETAILED DESCRIPTION OF THE INVENTION

First Embodiment

[Configuration of Power Supply System]

Figure 1:
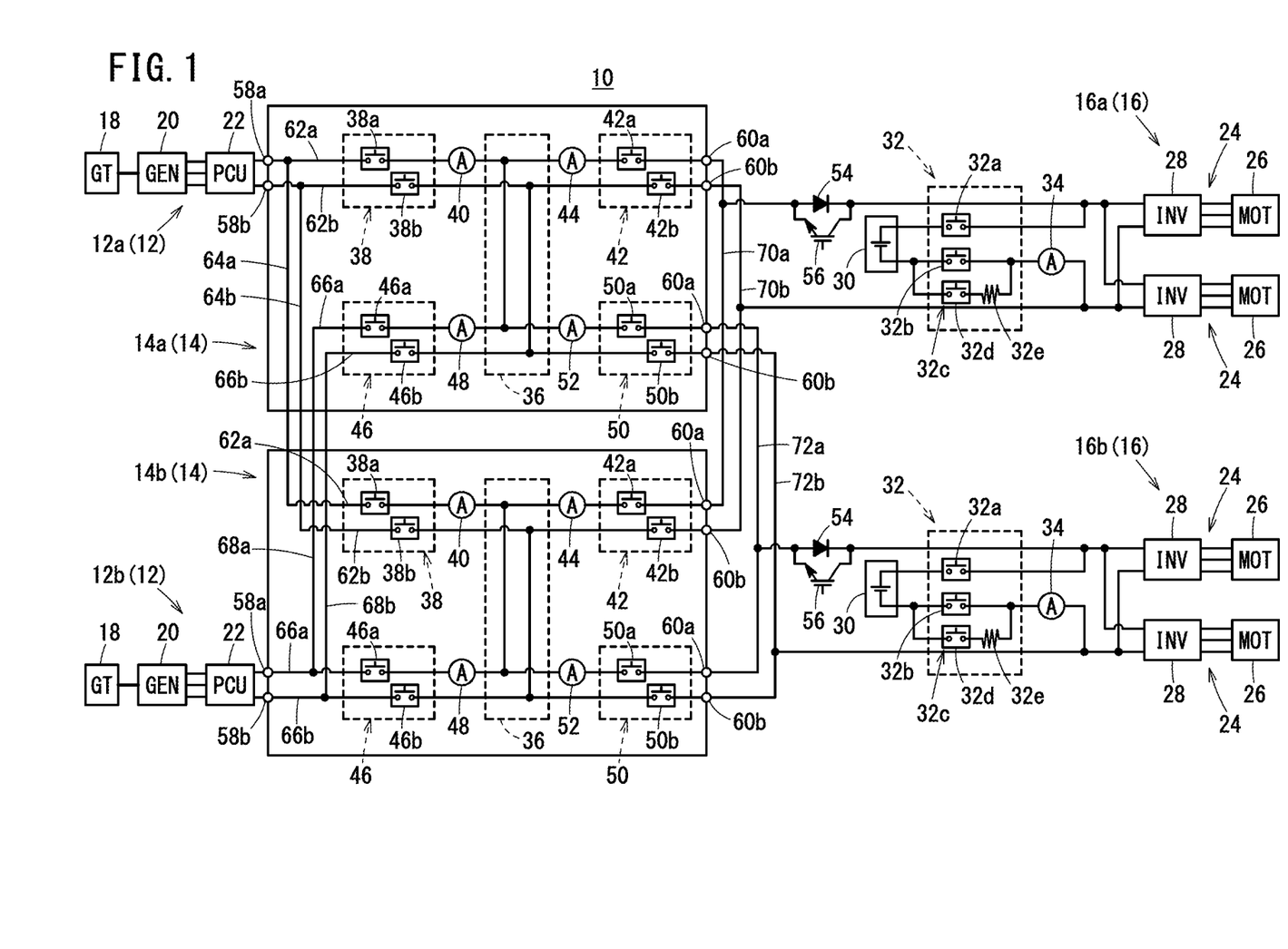
FIG. 1 is a schematic diagram showing a configuration of a power supply system.

FIG. 1 is a schematic diagram showing a configuration of a power supply system 10. The power supply system 10 is mounted in an aircraft. The aircraft is an electric vertical take-off and landing aircraft (eVTOL aircraft). The aircraft includes a plurality of rotors that generate thrust. In the aircraft, the rotors are driven by electric motors 26. Further, the aircraft is a hybrid aircraft. The aircraft includes a generator 20 and a battery 30 as power sources of the electric motor 26. In the aircraft, electric power generated by the generator 20 is supplied to the electric motor 26. When the electric power generated by the generator 20 is insufficient with respect to the required electric power, the electric power stored in the battery 30 is supplied to the electric motor 26.

The power supply system 10 includes two power generation units 12 and two power transmission devices 14. The two power transmission devices 14 indicate a first power transmission device 14a and a second power transmission device 14b. The two power generation units 12 indicate a first power generation unit 12a and a second power generation unit 12b. Each power transmission device 14 supplies electric power from each power generation unit 12 to each of two drive modules 16. The two drive modules 16 indicate a first drive module 16a and a second drive module 16b. Electric power stored in each battery 30 is supplied to each drive module 16, separately from the electric power generated by each power generation unit 12. Instead of the battery 30, a capacitor may be used. The drive module 16 corresponds to a load device of the present invention.

Each power generation unit 12 includes a gas turbine 18, the generator 20, and a power control unit (hereinafter referred to as PCU) 22. The gas turbine 18 drives the generator 20. As a result, the generator 20 generates electric power. The PCU 22 converts the AC power generated by the generator 20 into DC power, and outputs the DC power to the power transmission device 14. In other words, the PCU 22 functions as an AC-DC converter. The PCU 22 corresponds to a power source device of the present invention.

When starting the gas turbine 18, the PCU 22 converts the DC power supplied from the power transmission device 14 into AC power, and outputs the AC power to the generator 20. The generator 20 is operated by the electric power input from the PCU 22, and the generator 20 drives the gas turbine 18.

Each drive module 16 includes two drive units 24. Each drive unit 24 includes the electric motor 26 and an inverter 28. The electric motor 26 is a three phase AC motor. The rotor is coupled to the output shaft of the electric motor 26. The inverter 28 converts the DC power supplied from each power transmission device 14 into three phase AC power, and outputs the three phase AC power to the electric motor 26.

The battery 30 is connected to each drive module 16. A contactor unit 32 is provided between each battery 30 and each drive module 16. Each contactor unit 32 includes a contactor 32a, a contactor 32b, and a precharge circuit 32c. The contactor 32a is provided on a positive wire that connects each battery 30 and each drive module 16. The contactor 32b is provided on a negative wire that connects each battery 30 and each drive module 16. The precharge circuit 32c is provided in parallel with the contactor 32b. The precharge circuit 32c includes a contactor 32d and a resistor 32e. A current sensor 34 is provided on a wire that connects each contactor 32b and each drive module 16.

Each contactor unit 32 switches between a conduction state and an interruption state, between each battery 30 and each drive module 16. The conduction state is a state in which the flow of current is not interrupted, and thus current flows. The interruption state is a state in which the flow of current is interrupted.

Each contactor unit 32 may include only the contactor 32b and the precharge circuit 32c. The precharge circuit 32c may be provided in parallel with the contactor 32a. In this case, each contactor unit 32 may include only the contactor 32a and the precharge circuit 32c.

Each power transmission device 14 includes a power transmission path 36. Each power transmission path 36 supplies electric power from each power generation unit 12 to each drive module 16.

Each power transmission device 14 includes a contactor unit 38. Each contactor unit 38 is provided between the first power generation unit 12a and each power transmission path 36. Each contactor unit 38 includes a contactor 38a and a contactor 38b. Each contactor 38a is provided on a positive wire 62a that connects the first power generation unit 12a and each power transmission path 36. Each contactor 38b is provided on a negative wire 62b that connects the first power generation unit 12a and each power transmission path 36. A current sensor 40 is provided between each contactor 38a and each power transmission path 36.

Each contactor unit 38 switches between the conduction state and the interruption state, between the first power generation unit 12a and each power transmission path 36.

Each power transmission device 14 includes a contactor unit 42. Each contactor unit 42 is provided between the first drive module 16a and each power transmission path 36. Each contactor unit 42 includes a contactor 42a and a contactor 42b. Each contactor 42a is provided on a positive wire that connects the first drive module 16a and each power transmission path 36. Each contactor 42b is provided on a negative wire that connects the first drive module 16a and each power transmission path 36. A current sensor 44 is provided between each contactor 42a and each power transmission path 36.

Each contactor unit 42 switches between the conduction state and the interruption state, between the first drive module 16a and each power transmission path 36.

Each power transmission device 14 includes a contactor unit 46. Each contactor unit 46 is provided between the second power generation unit 12b and each power transmission path 36. Each contactor unit 46 includes a contactor 46a and a contactor 46b. Each contactor 46a is provided on a positive wire 66a that connects the second power generation unit 12b and each power transmission path 36. Each contactor 46b is provided on a negative wire 66b that connects the second power generation unit 12b and each power transmission path 36. A current sensor 48 is provided between each contactor 46a and each power transmission path 36.

Each contactor unit 46 switches between the conduction state and the interruption state, between the second power generation unit 12b and each power transmission path 36.

Each power transmission device 14 includes a contactor unit 50. Each contactor unit 50 is provided between the second drive module 16b and each power transmission path 36. Each contactor unit 50 includes a contactor 50a and a contactor 50b. Each contactor 50a is provided on a positive wire that connects the second drive module 16b and each power transmission path 36. Each contactor 50b is provided on a negative wire that connects the second drive module 16b and each power transmission path 36. A current sensor 52 is provided between each contactor 50a and each power transmission path 36.

Each contactor unit 50 switches between the conduction state and the interruption state, between the second drive module 16b and each power transmission path 36.

A diode 54 is provided between each battery 30 and each power transmission device 14. Each diode 54 is provided on a positive wire that connects each battery 30 and each power transmission device 14. An anode of each diode 54 is connected to the power transmission device 14 side, and a cathode thereof is connected to the battery 30 side. Each diode 54 allows electric power to be supplied from each power transmission path 36 to each battery 30. Each diode 54 prevents electric power from flowing from each battery 30 to each power transmission path 36.

Thus, electric power is supplied from each power generation unit 12 to each battery 30 via each diode 54. As a result, each battery 30 is charged. Further, when each power transmission path 36 is short-circuited, the electric power of each battery 30 is prevented from flowing to the power transmission path 36. As a result, even when each power transmission path 36 is short-circuited, electric power can be supplied from each battery 30 to each drive module 16.

A transistor 56 is provided in parallel with each diode 54. When the transistor 56 is ON, electric power is supplied from each battery 30 to each power transmission path 36 while bypassing the diode 54.

The power supply system 10 supplies electric power from the first power generation unit 12a and the second power generation unit 12b to the first drive module 16a and the second drive module 16b, by using one of the first power transmission device 14a or the second power transmission device 14b. When an abnormality occurs in one of the first power transmission device 14a or the second power transmission device 14b, electric power can be supplied from the first power generation unit 12a and the second power generation unit 12b to the first drive module 16a and the second drive module 16b, by using the other of the first power transmission device 14a and the second power transmission device 14b.

[Arrangement of Terminals of Power Transmission Device]

As shown in FIG. 1, each power transmission device 14 includes one power-source-side positive terminal 58a and one power-source-side negative terminal 58b. Each power transmission device 14 includes two load-side positive terminals 60a and two load-side negative terminals 60b. The power-source-side positive terminal 58a and the power-source-side negative terminal 58b each correspond to an input terminal of the present invention. The power-source-side positive terminal 58a corresponds to a positive terminal. The power-source-side negative terminal 58b corresponds to negative terminal. The load-side positive terminal 60a and the load-side negative terminal 60b each correspond to an output terminal of the present invention. The load-side positive terminal 60a corresponds to a positive terminal of the present invention. The load-side negative terminal 60b corresponds to a negative terminal of the present invention.

The PCU 22 of the first power generation unit 12a is connected to the power-source-side positive terminal 58a and the power-source-side negative terminal 58b of the first power transmission device 14a. The PCU 22 of the second power generation unit 12b is connected to the power-source-side positive terminal 58a and the power-source-side negative terminal 58b of the second power transmission device 14b.

The positive wire 62a on which the contactor 38a is provided in the first power transmission device 14a and the positive wire 62a on which the contactor 38a is provided in the second power transmission device 14b are connected via a positive connection wire 64a. The negative wire 62b on which the contactor 38b is provided in the first power transmission device 14a and the negative wire 62b on which the contactor 38b is provided in the second power transmission device 14b are connected via a negative connection wire 64b.

The positive wire 66a on which the contactor 46a is provided in the first power transmission device 14a and the positive wire 66a on which the contactor 46a is provided in the second power transmission device 14b are connected via a positive connection wire 68a. The negative wire 66b on which the contactor 46b is provided in the first power transmission device 14a and the negative wire 66b on which the contactor 46b is provided in the second power transmission device 14b are connected via a negative connection wire 68b.

One of the load-side positive terminals 60a of the first power transmission device 14a and one of the load-side positive terminals 60a of the second power transmission device 14b are connected by a positive connection wire 70a. One of the load-side negative terminals 60b of the first power transmission device 14a and one of the load-side negative terminals 60b of the second power transmission device 14b are connected by a negative connection wire 70b. The first drive module 16a is connected to the first power transmission device 14a and the second power transmission device 14b via the positive connection wire 70a and the negative connection wire 70b.

The other of the load-side positive terminals 60a of the first power transmission device 14a and the other of the load-side positive terminals 60a of the second power transmission device 14b are connected by a positive connection wire 72a. The other of the load-side negative terminals 60b of the first power transmission device 14a and the other of the load-side negative terminals 60b of the second power transmission device 14b are connected by a negative connection wire 72b. The second drive module 16b is connected to the first power transmission device 14a and the second power transmission device 14b via the positive connection wire 72a and the negative connection wire 72b.

Figure 2:
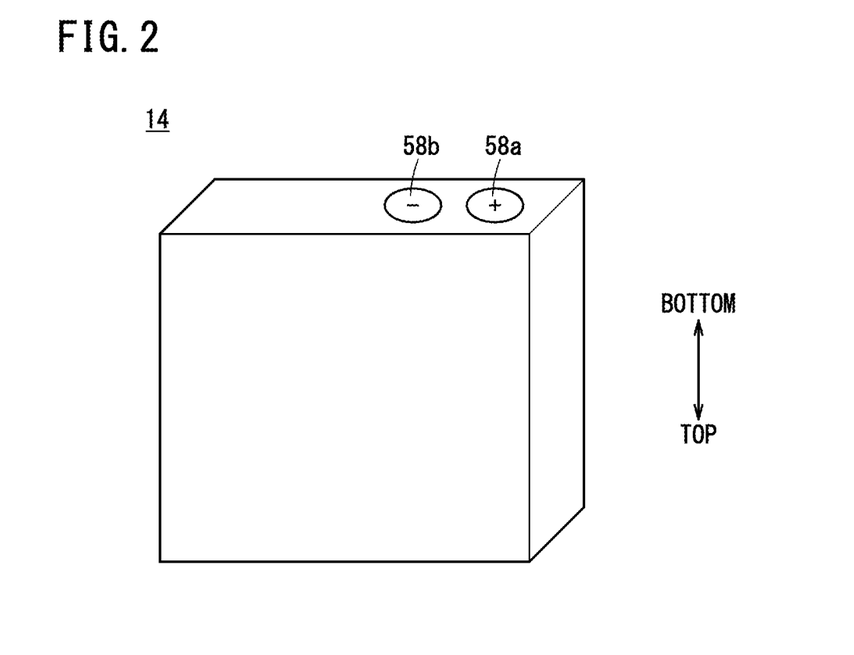
FIG. 2 is a schematic diagram of a power transmission device.
Figure 3:
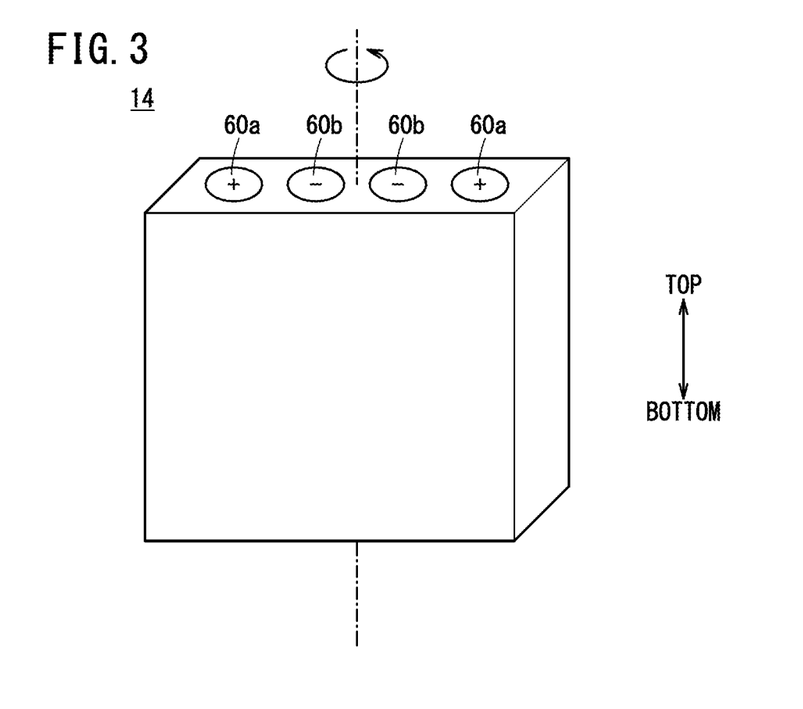
FIG. 3 is a schematic diagram of the power transmission device.

FIGS. 2 and 3 are schematic diagrams of the power transmission device 14. The first power transmission device 14a and the second power transmission device 14b have the same shape.

The outer shape of the power transmission device 14 is a substantially rectangular parallelepiped. As shown in FIG. 2, the power-source-side positive terminal 58a and the power-source-side negative terminal 58b are provided on the lower surface of the power transmission device 14.

As shown in FIG. 3, two load-side positive terminals 60a and two load-side negative terminals 60b are provided on the upper surface of the power transmission device 14. The two load-side positive terminals 60a and the two load-side negative terminals 60b are arranged in a line in the order of the load-side positive terminal 60a, the load-side negative terminal 60b, the load-side negative terminal 60b, and the load-side positive terminal 60a. Note that the two load-side positive terminals 60a and the two load-side negative terminals 60b may be arranged in a line in the order of the load-side negative terminal 60b, the load-side positive terminal 60a, the load-side positive terminal 60a, and the load-side negative terminal 60b. As a result, even when the power transmission device 14 is rotated by 180° about a rotation axis extending in the up-down direction, the arrangement of the load-side positive terminals 60a and the load-side negative terminals 60b does not change.

Figure 4:
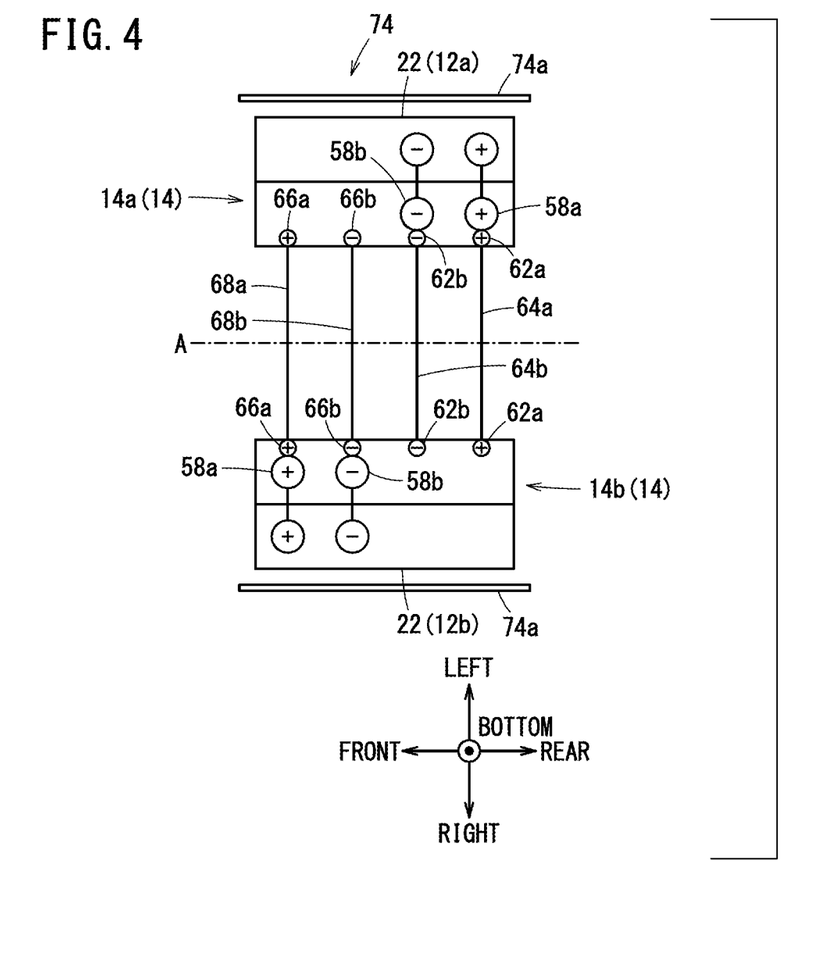
FIG. 4 is a diagram showing the power transmission device disposed in a fuselage of an aircraft.
Figure 5:
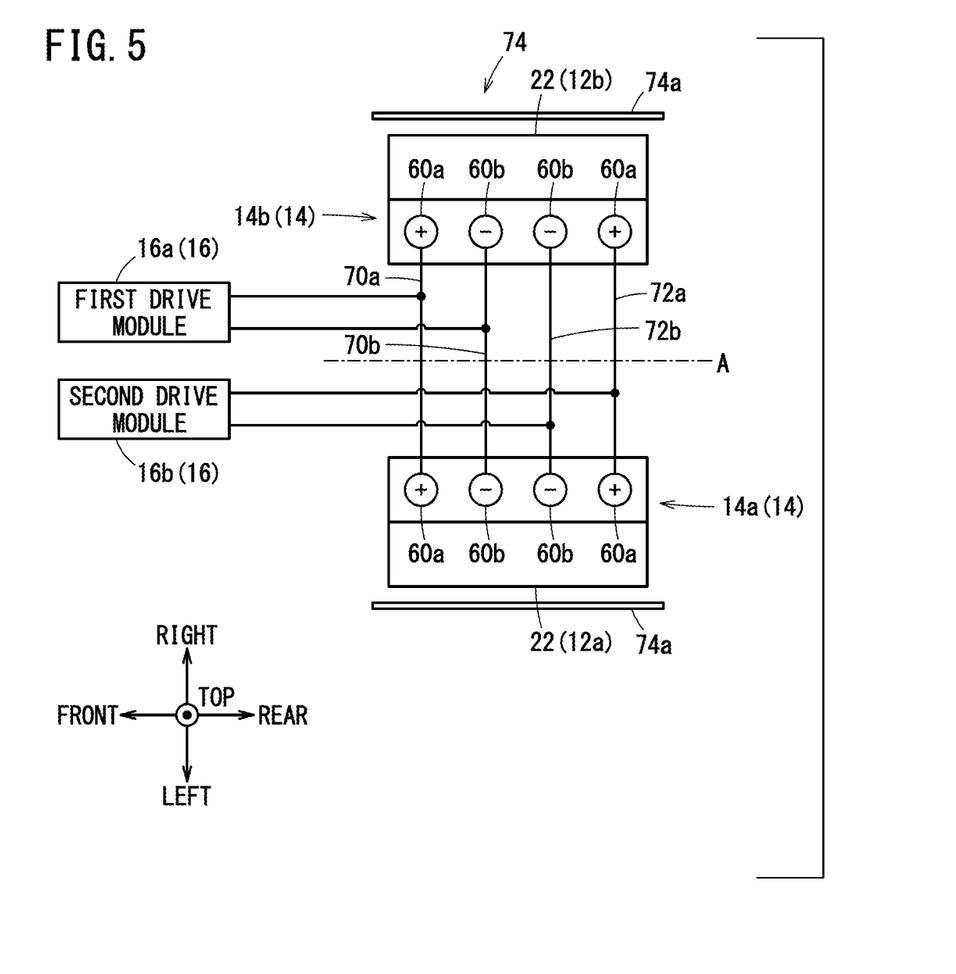
FIG. 5 is a diagram showing the power transmission device disposed in the fuselage of the aircraft.

FIGS. 4 and 5 are diagrams showing the power transmission device 14 disposed in a fuselage 74 of the aircraft. FIG. 4 is a bottom view of the power transmission device 14. FIG. 5 is a top view of the power transmission device 14.

The first power transmission device 14a and the second power transmission device 14b are disposed between the PCU 22 of the first power generation unit 12a and the PCU 22 of the second power generation unit 12b. The second power transmission device 14b is disposed in a state of being rotated by 180° with respect to the first power transmission device 14a, and the first power transmission device 14a and the second power transmission device 14b are disposed to face each other with the same surfaces facing each other.

The PCU 22 of the second power generation unit 12b is disposed in a state of being rotated by 180° with respect to the PCU 22 of the first power generation unit 12a. As a result, the positional relationship between each terminal of the first power transmission device 14a and each terminal of the PCU 22 of the first power generation unit 12a, and the positional relationship between each terminal of the second power transmission device 14b and each terminal of the PCU 22 of the second power generation unit 12b are maintained.

The first power transmission device 14a and the second power transmission device 14b are disposed across a center line A of the fuselage 74 in the widthwise direction. The distance between the center line A and the first power transmission device 14a is substantially equal to the distance between the center line A and the second power transmission device 14b. The first power transmission device 14a is disposed at a position closer to the center line A than the PCU 22 of the first power generation unit 12a is. In other words, the PCU 22 of the first power generation unit 12a is disposed at a position closer to a wall 74a of the fuselage 74 than the first power transmission device 14a is. The second power transmission device 14b is disposed at a position closer to the center line A than the PCU 22 of the second power generation unit 12b is. In other words, the PCU 22 of the second power generation unit 12b is disposed at a position closer to the wall 74a of the fuselage 74 than the second power transmission device 14b is. Thus, the weight distribution of the PCU 22 and the power transmission device 14 can be made substantially equal in the left-right direction of the fuselage 74.

Advantageous Effects

Figure 6:
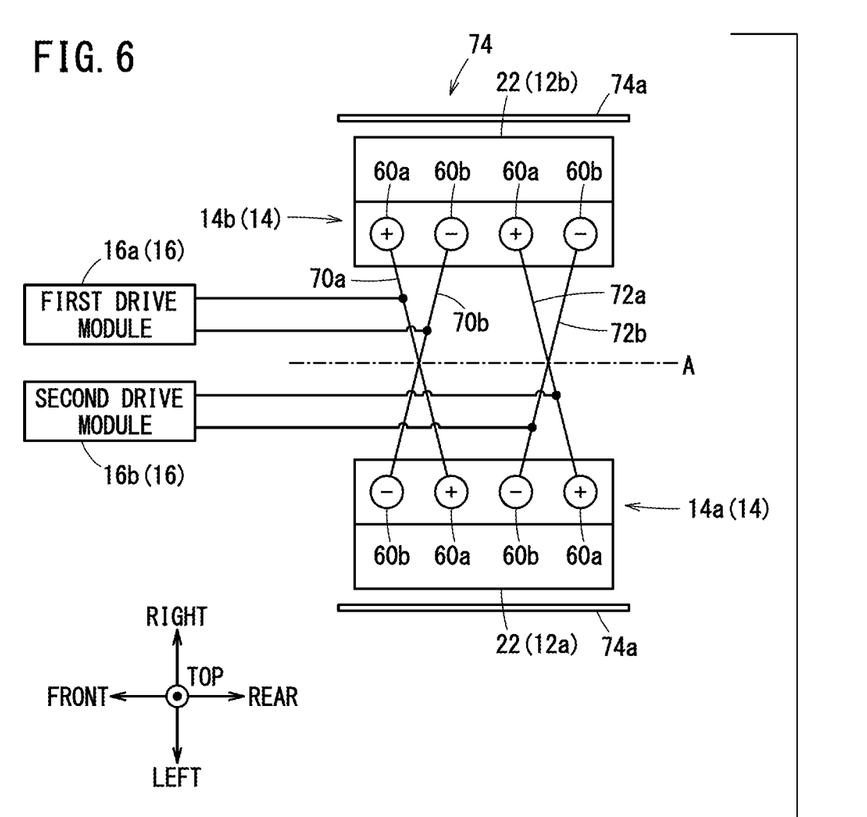
FIG. 6 is a diagram showing a power transmission device according to a comparative example, disposed in the fuselage of the aircraft.
Figure 7:
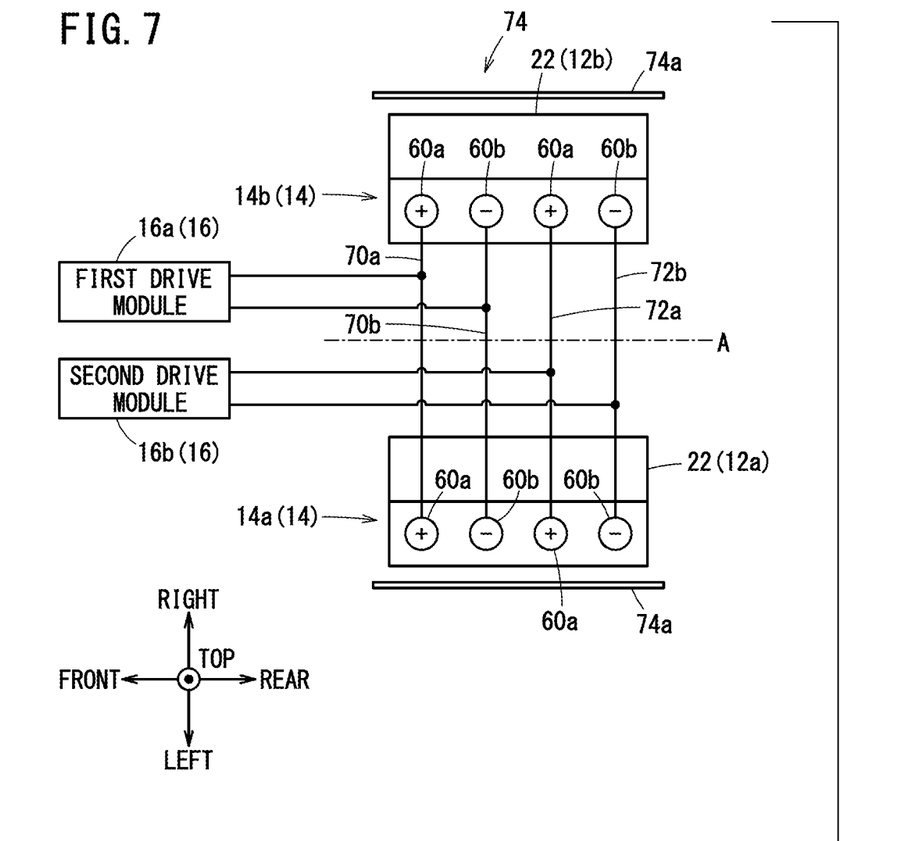
FIG. 7 is a diagram showing the power transmission device according to the comparative example, disposed in the fuselage of the aircraft.

FIGS. 6 and 7 are diagrams showing a power transmission device 14 according to a comparative example, disposed in the fuselage 74 of the aircraft.

In the power transmission device 14 of the comparative example, the two load-side positive terminals 60a and the two load-side negative terminals 60b are arranged in a line in the order of the load-side positive terminal 60a, the load-side negative terminal 60b, the load-side positive terminal 60a, and the load-side negative terminal 60b.

Therefore, when the second power transmission device 14b is disposed in a state of being rotated by 180° with respect to the first power transmission device 14a, then as shown in FIG. 6, the positive connection wire 70a and the negative connection wire 70b intersect with each other, and the positive connection wire 72a and the negative connection wire 72b intersect with each other. Thus, the wiring structure connecting the first power transmission device 14a and the second power transmission device 14b becomes complicated. As a result, there arises a problem in that the length of each of the positive connection wire 70a, the negative connection wire 70b, the positive connection wire 72a, and the negative connection wire 72b is increased, and the weight thereof is increased.

In order to prevent the wires connecting the first power transmission device 14a and the second power transmission device 14b from crossing each other, it is conceivable to arrange the second power transmission device 14b and the PCU 22 of the second power generation unit 12b as shown in FIG. 7.

In this case, the distance between the center line A and the first power transmission device 14a is different from the distance between the center line A and the second power transmission device 14b. The first power transmission device 14a is disposed at a position farther from the center line A than the PCU 22 of the first power generation unit 12a is. On the other hand, the second power transmission device 14b is disposed at a position closer to the center line A than the PCU 22 of the second power generation unit 12b is. Since the PCU 22 is heavier than each power transmission device 14, the weight distribution of the PCU 22 and the power transmission device 14 becomes uneven in the left-right direction of the fuselage 74.

In the power transmission device 14 of the present embodiment, the two load-side positive terminals 60a and the two load-side negative terminals 60b are arranged in a line in the order of the load-side positive terminal 60a, the load-side negative terminal 60b, the load-side negative terminal 60b, and the load-side positive terminal 60a. Thus, even when the power transmission device 14 is rotated by 180° about the rotation axis extending in the up-down direction, the arrangement of the load-side positive terminals 60a and the load-side negative terminals 60b does not change (FIG. 3). Therefore, the wires connecting the first power transmission device 14a and the second power transmission device 14b do not intersect with each other, and the wiring structure connecting the first power transmission device 14a and the second power transmission device 14b can be simplified (FIG. 5). As a result, the weight of the wires connecting the first power transmission device 14a and the second power transmission device 14b can be reduced. In addition, the weight distribution of the PCU 22 and the power transmission device 14 can be made substantially equal in the left-right direction of the fuselage 74.

In the power supply system 10 of the present embodiment, the first power transmission device 14a and the second power transmission device 14b are disposed so as to face each other between the two PCUs 22. As a result, the wiring structure connecting the first power transmission device 14a and the second power transmission device 14b can be simplified (FIG. 5).

Second Embodiment

Figure 8:
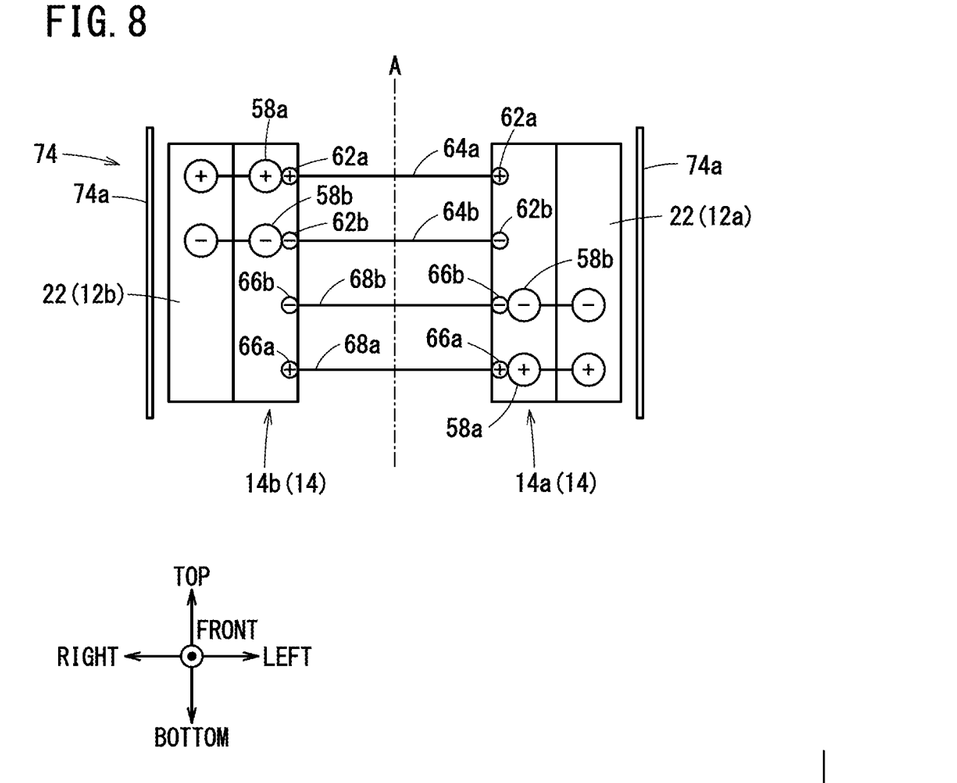
FIG. 8 is a diagram showing the power transmission device disposed in the fuselage of the aircraft.
Figure 9:
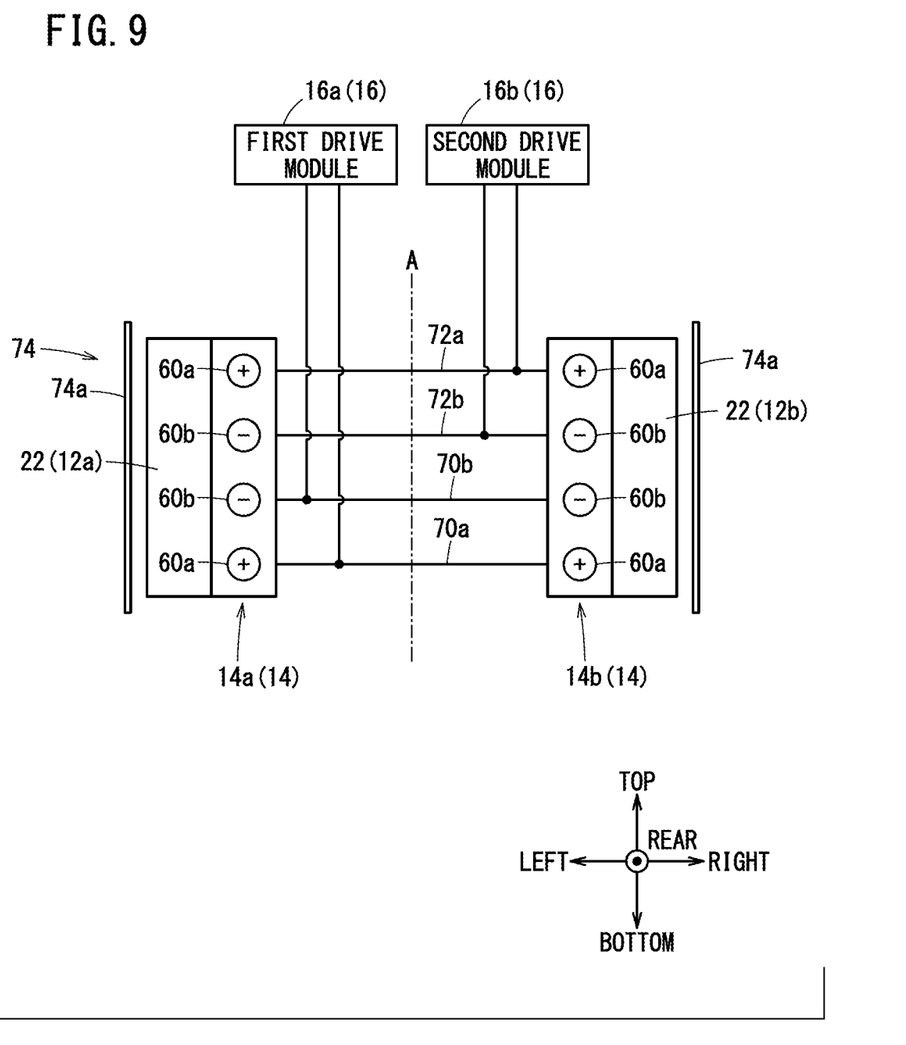
FIG. 9 is a diagram showing the power transmission device disposed in the fuselage of the aircraft.

FIGS. 8 and 9 are diagrams showing the power transmission device 14 disposed in the fuselage 74 of the aircraft. FIG. 8 is a front view of the power transmission device 14. FIG. 9 is a rear view of the power transmission device 14.

In the first embodiment, the load-side positive terminals 60a and the load-side negative terminals 60b are arranged on the upper surface of the power transmission device 14, and the power-source-side positive terminal 58a and the power-source-side negative terminal 58b are arranged on the lower surface of the power transmission device 14. On the other hand, in the second embodiment, the load-side positive terminals 60a and the load-side negative terminals 60b are arranged on the rear surface of the power transmission device 14, and the power-source-side positive terminal 58a and the power-source-side negative terminal 58b are arranged on the front surface of the power transmission device 14.

[Modification]

Note that the present invention is not limited to the above disclosure, and various modifications are possible without departing from the essence and gist of the present invention.

In the first embodiment, the load-side positive terminals 60a and the load-side negative terminals 60b are arranged on the upper surface of the power transmission device 14, and the power-source-side positive terminal 58a and the power-source-side negative terminal 58b are arranged on the lower surface of the power transmission device 14. Alternatively, the load-side positive terminals 60a and the load-side negative terminals 60b may be arranged on the lower surface of the power transmission device 14, and the power-source-side positive terminal 58a and the power-source-side negative terminal 58b may be arranged on the upper surface of the power transmission device 14.

In the second embodiment, the load-side positive terminals 60a and the load-side negative terminals 60b are arranged on the rear surface of the power transmission device 14, and the power-source-side positive terminal 58a and the power-source-side negative terminal 58b are arranged on the front surface of the power transmission device 14. Alternatively, the load-side positive terminals 60a and the load-side negative terminals 60b may be arranged on the front surface of the power transmission device 14, and the power-source-side positive terminal 58a and the power-source-side negative terminal 58b may be arranged on the rear surface of the power transmission device 14.

In the first embodiment and the second embodiment, the power transmission device 14 includes two load-side positive terminals 60a and two load-side negative terminals 60b. Instead, the power transmission device 14 may include four load-side positive terminals 60a and four load-side negative terminals 60b. In this case, the four load-side positive terminals 60a and the four load-side negative terminals 60b are arranged in a line in the order of the load-side positive terminal 60a, the load-side negative terminal 60b, the load-side negative terminal 60b, the load-side positive terminal 60a, the load-side positive terminal 60a, the load-side negative terminal 60b, the load-side negative terminal 60b, and the load-side positive terminal 60a. Alternatively, the four load-side positive terminals 60a and the four load-side negative terminals 60b may be arranged in a line in the order of the load-side negative terminal 60b, the load-side positive terminal 60a, the load-side positive terminal 60a, the load-side negative terminal 60b, the load-side negative terminal 60b, the load-side positive terminal 60a, the load-side positive terminal 60a, and the load-side negative terminal 60b.

The power supply system 10 may include a large-capacity battery instead of the power generation unit 12.

The power supply system 10 may include elements such as a fuse, a relay, a breaker, a transistor, a resistor, a coil, and a capacitor, in addition to the elements described in the first embodiment.

[Invention Obtained from Embodiments]

The invention that can be grasped from the above embodiments will be described below.

The power transmission device (14) that transmits electric power from the power source device (22) to the load devices (16) includes the input terminals (58a, 58b) connected to the power source device and configured to receive direct current power, and the output terminals (60a, 60b) each connected to corresponding one of the load devices and configured to output direct current power. The output terminals include two positive terminals (60a) and two negative terminals (60b), and the positive terminals and the negative terminals are arranged in a line in the order of the positive terminal, the negative terminal, the negative terminal, and the positive terminal, or in the order of the negative terminal, the positive terminal, the positive terminal, and the negative terminal.

The power supply system (10) including the two power transmission devices described above includes two power source devices, and the two power transmission devices are disposed so as to face each other between the two power source devices.

The invention claimed is:

1. A power transmission device that transmits electric power from a power source device to load devices, the power transmission device comprising:
input terminals connected to the power source device and configured to receive direct current power; and
output terminals each connected to corresponding one of the load devices and configured to output direct current power,
wherein the output terminals include two positive terminals and two negative terminals, and
the two positive terminals and the two negative terminals are arranged in a line in an order of a first of the two positive terminals, a first of the two negative terminals, a second of the two negative terminals, and a second of the two positive terminals, or in an order of the first of the two negative terminals, the first of the two positive terminals, the second of the two positive terminals, and the second of the two negative terminals.

2. A power supply system comprising:
a first power transmission device; and
a second power transmission device,
wherein the first power transmission device includes:
input terminals connected to a power source device and configured to receive direct current power; and
first and second positive terminals and first and second negative terminals each connected to corresponding one of load devices and configured to output direct current power,
the first and second positive terminals and the first and second negative terminals are arranged in a line in an order of the first positive terminal, the first negative terminal, the second negative terminal, and the second positive terminal, or in an order of the first negative terminal, the first positive terminal, the second positive terminal, and the second negative terminal,
the second power transmission device includes:
input terminals connected to another power source device and configured to receive direct current power; and
third and fourth positive terminals and third and fourth negative terminals each connected to corresponding one of the load devices and configured to output direct current power,
the third and fourth positive terminals and the third and fourth negative terminals of the second power transmission device are arranged in a line in an order of the third positive terminal, the third negative terminal, the fourth negative terminal, and the fourth positive terminal, or in an order of the third negative terminal, the third positive terminal, the fourth positive terminal, and the fourth negative terminal,
the first power transmission device and the second power transmission device are disposed between the power source device and the other power source device, and
the first power transmission device and the second power transmission device are disposed so as to face each other.

* * * * *